Jan. 3, 1950 J. KUPERUS 2,493,353

SYNCHRONIZING SIGNAL SEPARATING CIRCUIT

Filed Feb. 8, 1947 2 Sheets-Sheet 1

INVENTOR
JAN KUPERUS
BY [signature]
AGENT

Jan. 3, 1950 J. KUPERUS 2,493,353

SYNCHRONIZING SIGNAL SEPARATING CIRCUIT

Filed Feb. 8, 1947 2 Sheets-Sheet 2

INVENTOR
JAN KUPERUS
BY Fred M Vogel
AGENT

Patented Jan. 3, 1950

2,493,353

UNITED STATES PATENT OFFICE 2,493,353

SYNCHRONIZING SIGNAL SEPARATING CIRCUIT

Jan Kuperus, Eindhoven, Netherlands, assignor to Hartford National Bank and Trust Company, Hartford, Conn., as trustee Application February 8, 1947, Serial No. 727,468
In the Netherlands March 25, 1944

Section 1, Public Law 690, August 8, 1946
Patent expires March 25, 1964

1 Claim. (Cl. 178—7.3)

Figures 1A, 1B, 1C, 1D, 1E, 1F, 1G:
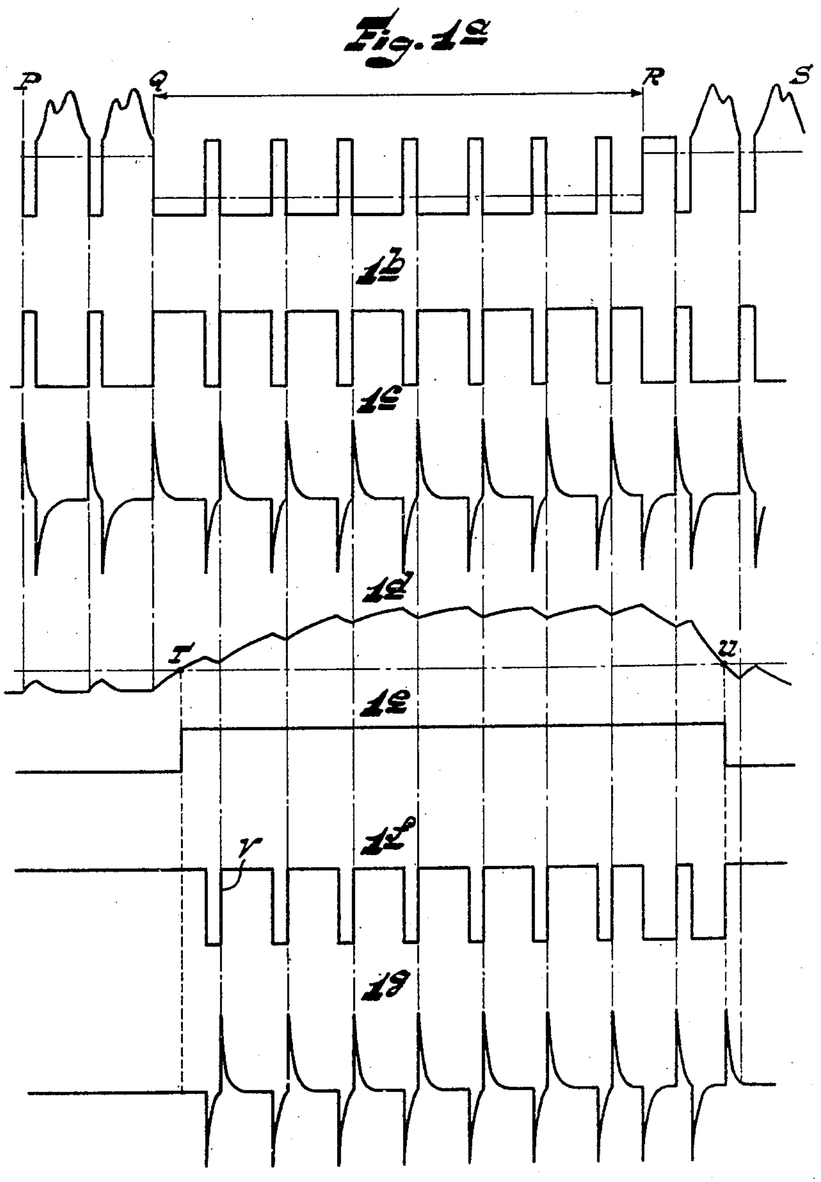

This invention relates to a system and a receiver for the transmission and the reception respectively of inanimated or animated images, more particularly of television pictures, in which system synchronization of the receiver picture with that transmitted is obtained by means of a signal having line pulses and image pulses which are interrupted once or several times by interrupting pulses.

According to a common method of image synchronization in television reception the parts of the incoming television signal corresponding to the image are first clipped and after that the remaining part is supplied to a network by which the pulses for synchronization of the image are separated from the pulses used for the line synchronization. A frequently used network consists of the parallel connection of two branches, each of which is formed by the series-connection of a resistor and a condenser; the line pulses being derived across the resistor of one branch, and the image pulses being derived across the condenser of the other branch.

This method has the disadvantage that the slope of the front of the image impulse is comparatively small, owing to which the image synchronization does not always start exactly at the same moment, which is very troublesome particularly when making use of interlaced scanning, since in this case in general the lines of one frame do not extend midway between the lines of the other frame.

Now the present invention procures a method of image synchronization, in which this evil is cured.

In the system, to which the invention relates, it is common practice to transmit one or more line synchronizing pulses during every image pulse and to avoid large current excursions to apply them in the opposite sense so as to create interrupting pulses having a fixed time relation with respect to the line synchronizing pulses. Alternately there may be a time relationship established between the interrupting pulses of succeeding image pulses with respect to one another.

In a suitable form of construction of a transmitting system according to the invention every image pulse is interrupted by pulses having a frequency equal to the line frequency or to a whole multiple, for example twice the line frequency, and for the image synchronization in the receiver use is made of one or more of these pulses, preferably the first of the interrupting pulses.

It is common to transmit simultaneously with the image synchronizing pulses and interruption pulses having a frequency equal to the line frequency or to a whole multiple, for example twice, of the line frequency. These interruption pulses were heretofore used solely to control the saw tooth generator for line scanning during the occurrence of an image synchronizing pulse.

In order that the invention may be clearly understood and readily carried into effect, it will now be set out more fully with reference to the accompanying drawings, in which is represented one form of construction of a receiver suitable for use in a system for transmitting television images according to the invention.

Fig. 1a represents the variation of a television signal of the kind used according to the invention. The full vertical lines, which are equidistantly spaced apart from each other, coincide in each instance with the leading impulse of a line pulse. The part of the signal shown between the points P and Q comprises two line pulses that are used for the synchronization of the line scanning, and in addition two parts which correspond to the television image of the respective lines. An image pulse is shown which extends from point Q to point R. From R to S the drawing shows two line synchronizing pulses and two portions of the image corresponding to the associated line synchronizing pulses.

According to the invention the image pulse is interrupted by a number of interrupting pulses at a frequency equal to the line frequency: the trailing impulse of these interrupting pulses is in fixed time relation with the leading impulse of the line pulses, consequently with the leading impulse on which the line scanning is synchronized. In the case of interlaced scanning it is sufficient to maintain a fixed time relation between the interrupting pulses of succeeding image pulses, since in this case the two frames already occupy their correct relative positions.

Fig. 1b represents the signal again, but now after the image has been cut off and the signal itself has passed through a reversing stage. The latter is required in the present case, since the line pulses must be supplied in a positive direction to the generator producing the saw-tooth voltage for the line scanning, and the leading impulse of the initial pulse is traversed in a negative sense.

Cursorily it may be observed that in several television systems the image signal is suppressed immediately before and after the image pulse during transmission. Frequently line pulses having a double frequency are transmitted not only during, but also immediately before and after the image pulse. The present invention may be used in a similar manner for these systems; as appears from the following, however, it is not necessary for a satisfactory operation of the transmission system according to the invention that line pulses of double the frequency are transmitted both before and after the image pulses.

In order to derive only the pulses for the line synchronization from the signal represented in Fig. 1*b*, the signal is applied to a differentiating network from which pulses as shown in Fig. 1*c* can be obtained. The positive peaks of these pulses, which coincide in each instance with the full vertical lines referred to above and consequently with the leading impulse of the initial line pulses, are used for the line synchronization.

According to the invention the pulses for the image synchronization may, for example, be obtained as follows. The signal shown in Fig. 1*b* is first of all applied to an integrating network whose output voltage varies in the manner as shown in Fig. 1*d*. This voltage in excess of a given threshold value is used to select definite impulses from the initial series of pulses (see Fig. 1*b*). The said threshold value is indicated in the figure by a horizontal dot-and-dash line. At T the output voltage of the integrating network exceeds this threshold value and from this point the selection can consequently take place. The period of selection lasts till point U is reached, where the output voltage of the network again becomes lower than the threshold value. Fig. 1*e* shows the period of selection diagrammatically by a block line, whilst Fig. 1*f* shows the impulses selected from the initial series of pulses in this period.

For the image synchronization the trailing impulse of the first selected pulse is used, which pulse is designated V in Fig. 1*f*. The moment at which the trailing impulse of pulse V occurs is in fixed time relation with the moments at which the leading impulses of the line pulses appear.

To permit the trailing impulse of the pulse V to be used as a synchronization impulse, the selected pulses are supplied to a reversing stage and subsequently to a differentiating network; the former is necessary because a positive pulse must be used for synchronization. The pulse output voltage of the differentiating network is used for the image synchronization; the output voltage is shown in detail in Fig. 1*g*. From this figure it appears that the first positive peak coincides with the trailing impulse of the pulse V and also with one of the full vertical lines indicating the moments of the line synchronization.

Figure 2:
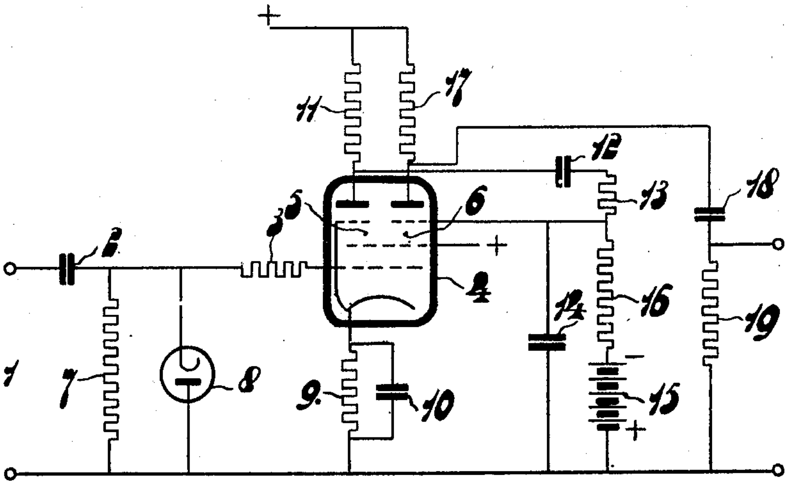

Fig. 2 represents a circuit arrangement by means of which the impulses for the image synchronization can be produced in the manner set out above.

The television signal is supplied to the terminals 1 of the circuit and transmitted to the control grid of a tube 4 through a condenser 2 and a resistor 3. This tube comprises two discharge systems 5 and 6 which have a cathode, a control grid and screen grid in common, but whose anodes and a set of further grids are arranged separately. In addition the control grid circuit of the system 5 includes a resistor 7, a diode 8 and a parallel connection of a resistor 9 and a condenser 10. The network composed by the elements 2, 3, 7, 8, 9 and 10 constitutes a circuit arrangement known per se for the separation of the image signal from the synchronization pulses.

The signal shown in Fig. 1*a* is applied to the input terminals 1 and is applied to the control grid of discharge system 5 through the intermediary of a condenser 2 and an isolating resistor 3. The control grid is biased through a grid-leak resistor 7 by means of a negative voltage derived from the shunt combination of a resistor 9 and condenser 10 interposed in the cathode lead of discharge system 5. Across resistor 7 there is shunted a diode 8 having the cathode connected to condenser 2 to rectify the negative synchronizing pulses and to charge condenser 2 to the peak value of the pulses with respect to the blanking level and stabilize the pulses in the usual manner. During the occurrence of these pulses the grid potential of discharge system 5 is therefore negative with respect to the cathode of discharge system 5 by an amount equal to the voltage derived across resistor 9. Grid current will flow as soon as the potential at the cathode of diode 8 rises above this voltage, in which case, however, the biasing potential on the grid of discharge system 5 will still be equal to the voltage derived across resistor 9, since this voltage difference exists across resistor 3. It is necessary to supply a signal in which the pulse height from the bottom to the blanking level is larger than the biasing voltage derived across resistor 9.

At the control grid of the discharge system 5 there is consequently set up a voltage having the form shown in Fig. 1*a*, from which, however, the image signals have been clipped. Consequently, at the resistor 11 located in the anode circuit of the system 5 a voltage as shown in Fig. 1*b* is obtained. This voltage is supplied through a blocking condenser 12 to an integrating network which consists of two resistors 13 and 16 and a condenser 14 and whose output voltage is applied to the third grid of the discharge system 6. A battery 15, connected in series with resistor 16, provides a negative bias by means of which the threshold value shown in Fig. 1*d* is realized.

The discharge system 6 conducts only when the positive voltage through the condenser 14 exceeds the threshold value ($T-U$ in Fig. 1*d*). Hence, only the pulses shown in Fig. 1*f* can appear across resistor 17 located in the anode lead of discharge system 6. These pulses are supplied to a differentiating network consisting of a condenser 18 and a resistor 19, whose output voltage, which is derived across the resistor 19, has the form shown in Fig. 1*g*. This voltage is used for image synchronization and to this end it is applied to a saw-tooth generator (not shown) which produces the saw-tooth voltage for the vertical image scanning. In accordance with the adjustment of this saw-tooth generator the synchronisation takes place on the first or on one of the next peak voltages shown in Fig. 1*g*. Preferably, however, synchronization takes place on the first peak voltage.

It follows from what has been said above that the image synchronization takes place a fixed time after synchronization of the line scanning. In the common circuit arrangements for the aforesaid purpose this is not the case; in these circuits synchronization takes place by means of the image impulse itself (shown in Fig. 1*d*) at the moment at which this impulse exceeds a definite threshold value. This moment (point T in Fig. 1*d*) has no fixed position relatively to the preceding line pulses, so that also the image synchronization is not in a fixed time relationship with the line pulses with all consequent aforesaid disadvantages. Also with the present invention the point T may move to and fro, but in this case the variable position of the point is of no importance since it is not the point T but the trailing impulse of the selected pulse V which determines the moment of synchronization. With the present invention the point T is, of course, not allowed in general to shift so far that the impulse, on which synchronization should take place, is no longer selected. The point T, however, may shift through a very large margin before the synchronization fails. In the common method of synchronization, on the contrary, the point T cannot be allowed to shift at all, particularly in the case of interlaced scanning.

However, a displacement of the point T readily occurs; since the position of the point T is determined inter alia by the amplitude of the image pulse, by any disturbances taking place in the image pulse and by the degree of line pulse occurring in the image pulse. In practice, the line pulse is never completely separated from the image pulse. Consequently, voltages of the line pulses are always superposed on the image pulse voltage. The presence of these superposed voltages is extremely detrimental to a good synchronization, particularly in the case of interlaced scanning. In fact, the superposed line pulse voltages are different for an even and for an odd image pulse, since the place of these image pulses relatively to the line pulses is different. In the common method this requires the synchronization of the even frame to be different from that of the odd frame, so that the interlaced scanning miscarries entirely or almost entirely. Attempts have been made to eliminate this disadvantage by transmitting line pulses of double the line frequency before, after and during the image pulse, thus to equalize as much as possible the two kinds of image pulses. The present invention, however, obviates this expedient.

Thus far the specification has mentioned only television signals and the description of the invention based on so-called positive modulation of the image. The invention, however, also applies to systems in which transmission with negative modulation takes place (the maximum amplitude of the carrier wave corresponding with the peaks of the line pulses).

What I claim is:

A synchronizing circuit arrangement for a television receiver responsive to signals comprising line synchronizing pulses and image synchronizing pulses comprising a plurality of interruption pulses occurring within the period of said image synchronizing pulses and appearing in fixed time relationship with respect to said line synchronizing pulses, comprising an electron discharge device having a first anode, a second anode, a cathode common to said anodes, a first control grid common to said anodes and interposed between said anodes and said cathode, and a second control grid interposed between said second anode and said first control grid, said cathode, first control grid, second control grid and second anode forming a transmission path, means to apply said image synchronizing pulses and said interruption pulses to said first control grid, a network coupled between said first anode and said second control grid for integrating image synchronizing pulses derived from said first anode, and biasing means interposed in said integrating network to normally close said transmission path for values of said integrating pulses below a predetermined threshold value.

JAN KUPERUS.

REFERENCES CITED

The following references are of record in the file of this patent:

UNITED STATES PATENTS

| Number | Name | Date |
|---|---|---|
| 2,210,523 | Blumlein | Aug. 6, 1940 |
| 2,224,134 | Blumlein | Dec. 10, 1940 |
| 2,273,546 | Van Weel | Feb. 17, 1942 |

FOREIGN PATENTS

| Number | Country | Date |
|---|---|---|
| 847,675 | France | Oct. 13, 1939 |
| 517,181 | Great Britain | Jan. 23, 1940 |
| 529,790 | Great Britain | Nov. 28, 1940 |
| 869,945 | France | Feb. 24, 1942 |